United States Patent [19]

Edwards et al.

[11] Patent Number: 5,787,372

[45] Date of Patent: Jul. 28, 1998

[54] AUTOMATED FLUID CHANGING SYSTEM WITH SINGLE-POINT CONNECTION

[76] Inventors: Robert W. Edwards, Star Rt. Box 8, Lyman Daniel Rd., Trenton, Ga. 30752; Guy E. Whited, III, 5404 Greenough Way, Greensboro, N.C. 27410

[21] Appl. No.: 381,686

[22] Filed: Jan. 27, 1995

Related U.S. Application Data

[63] Continuation-in-part of Ser. No. 232,473, Apr. 25, 1994, abandoned.

[51] Int. Cl.$^6$ ................................................ F01M 1/00
[52] U.S. Cl. ............................... 701/29; 701/31; 701/33; 123/198 DA; 184/15
[58] Field of Search .................. 364/424.03, 424.034, 364/434.035, 434.036, 434.038, 434.04; 184/1.5; 123/196 A, 196 R, 196 SL, 198 DA

[56] References Cited

U.S. PATENT DOCUMENTS

| | | | |
|---|---|---|---|
| 3,216,527 | 11/1965 | Lewis | 184/1.5 |
| 4,776,430 | 10/1988 | Rule | 184/1.5 |
| 4,884,660 | 12/1989 | Bedi | 184/1.5 |
| 4,909,205 | 3/1990 | Bewley, III | 123/196 S |
| 4,976,233 | 12/1990 | Bedi et al. | 123/196 R |
| 4,977,978 | 12/1990 | Batrice | 184/1.5 |
| 5,044,334 | 9/1991 | Bedi | 123/196 R |
| 5,056,621 | 10/1991 | Trevino | 184/1.5 |

(List continued on next page.)

FOREIGN PATENT DOCUMENTS

| | | |
|---|---|---|
| 0337593 | 10/1989 | European Pat. Off. |
| 2174491 | 10/1973 | France . |
| 4429317 | 4/1995 | Germany . |
| 9315309 | 8/1993 | WIPO . |

OTHER PUBLICATIONS

Lincoln Oil Handling Equipment, Lincoln, One Lincoln Way, St. Louis, MO 63120-1578, Nov. 1992, p. 1. WasteEvac Fluid Storage.

Graco Port–Evac, Graco Inc., P.O. Box 1441, Minneapolis MN, 55440–1441, Feb. 1992, p. 3, 45–47.

(List continued on next page.)

*Primary Examiner*—Kevin J. Teska
*Assistant Examiner*—Russell W. Frejd
*Attorney, Agent, or Firm*—Baker, Donelson, Bearman & Caldwell

[57] ABSTRACT

An automated system for rapidly and safely evacuating used fluid from the drain plug opening of a fluid receptacle and replenishing the fluid receptacle with fresh fluid through the same drain plug opening. The automated fluid changing system includes an evacuation means for withdrawing the used fluid from the drain plug opening, a dispensing means for dispensing fresh fluid into the fluid receptacle through the drain plug opening, valve means for controlling the flow of fluids into and out of the fluid receptacle, and electronic control means which is in communication with the valve means, the evacuation means, and the dispensing means for automatically directing each phase of the fluid changing procedure. The evacuation means includes a suction pump for applying a suction force to withdraw the used fluid. The dispenser means includes a pump for dispensing the fluid into the fluid receptacle under pressure. The fluid changing system may be configured to dispense several different types of fluid, and is particularly suitable for dispensing automotive fluids, such as different grades of oil. Air pressure from an external source is used to force all of the fresh fluid out of the dispenser means and into the fluid receptacle to prevent any substantial amount of the fresh fluid from mixing with a different type of fluid which may subsequently be dispensed through the fluid changing system. A computer controller automatically initiates the evacuation of the used fluid and the dispensing of fresh fluid upon receipt of appropriate instructions by an operator via a user interface panel.

21 Claims, 5 Drawing Sheets

U.S. PATENT DOCUMENTS

| | | | |
|---|---|---|---|
| 5,070,831 | 12/1991 | Yunick | 123/196 A |
| 5,074,380 | 12/1991 | Bedi et al. | 184/1.5 |
| 5,203,429 | 4/1993 | Zager | 184/1.5 |
| 5,209,198 | 5/1993 | Bedi | 123/196 R |
| 5,263,445 | 11/1993 | Bedi et al. | 123/196.05 |
| 5,273,085 | 12/1993 | Edwards et al. | 141/83 |
| 5,327,861 | 7/1994 | Rogalla et al. | 123/196 S |
| 5,411,114 | 5/1995 | Bedi et al. | 184/1.5 |
| 5,452,695 | 9/1995 | Bedi | 123/196 A |

OTHER PUBLICATIONS

Balcrank Oil Pumps, Balcrank Products, Inc., One Balcrank Way Weaverville, NC 28787, p. 5, 12, 52, no date.

Alemite Evacuation System, Alemite Corp., 4701 Park Rd. Charlott, N.C. 28209–9967, pp. 6, 48, 49, no date.

Grover Evacuation Pumps, Grover MFG Corp., 620 So Van Ave., Montebello, CA 90640, 1990, pp. 7, 26.

Fluid Evacuator's "EZ" Evacuator, Fluid Evacuators, 1902 E. Inea Circle, Mesa, AZ.85203.

Lincoln Waste Fluid Evacuation Systems.

AUTOMATED FLUID CHANGING SYSTEM WITH SINGLE-POINT CONNECTION

CROSS-REFERENCE

The present application is a continuation-in-part of application Ser. No. 08/232,473, filed Apr. 25, 1994, entitled "Rapid Oil Change Device", now abandoned.

BACKGROUND

The present invention relates generally to a system for automatically changing fluids in a fluid receptacle having a drain plug opening, such as internal combustion engines or other automotive fluid receptacles, and more specifically to a software driven, computerized system which uses suction to remove used fluids and pressure to replenish fresh fluids through the same drain plug opening of a fluid receptacle.

More than 300 million gallons of used motor oil and other automotive fluids are carelessly dumped into the watersheds of America every year. As waste fluids seep into ground water, thousands of streams and rivers are polluted with dangerously high levels of toxins. One gallon of used motor oil can contaminate one million gallons of water. Presently, whether or not waste contaminants are kept out of the water supply depends on the goodwill of the person performing the fluid change.

Heavy truck fleet operations in the United States account for more than 160 million oil changes annually. Over 10 gallons of oil are replaced during each change, resulting in over 1.6 billion gallons of used oil. Small vehicle and light truck fleets account for another 500 million gallons of used oil annually. Current methods for collecting used oil are either inadequate, too time consuming, potentially dangerous to the engine being serviced, or are not true automated processes. Increasing pressure from the Environmental Protection Agency and many local authorities create additional burdens for truck fleet managers in accounting for used fluids and protecting the environment from used fluid spillage during fluid changes.

The most common method for changing oil involves manually removing the oil pan drain plug and allowing gravity to drain the used oil through the drain plug opening into a catching pan. The drain plug is replaced and then fresh oil is added to the engine through an opening provided in the valve cover for this purpose. This method is very time consuming, and can take as long as one and one-half hours in large vehicles which contain 40 to 50 quarts of oil in the oil pan. Also, there is the ever present hazard of knocking over the catch pan and spilling the waste oil.

Many devices and methods have been developed which attempt to provide a faster and cleaner oil changing procedure. However, these methods merely evacuate used oil from portable roll-around style used oil receivers and then transfer the used oil to a waste oil containment device. The devices do not attach directly to the vehicle and cannot replenish a vehicle with fresh oil.

Efforts to reduce the mess involved with most oil changes on large vehicles include devices which remove old oil from an oil pan with a suction pump and a wand or probe that reaches inside the vehicle crankcase through the dipstick opening. This process eliminates the need to remove the oil pan plug and helps reduce spillage and messes. However, this process may not completely remove all of the oil from the oil pan due to the wand design or improper insertion of wand and it also cannot replenish a vehicle with fresh oil.

A variation of the above-described oil changer removes used oil from an oil pan with a suction pump connected to a wand inserted through the dipstick tube. The oil pan is then replenished with fresh oil through the same wand. However, this device often does not completely remove all the used oil from the oil pan. When fresh oil is added to the oil pan, the oil pan may overfill since a portion of the old oil may remain in the oil pan. Further, this process is not automated and the small diameter of the wand greatly restricts the flow rates of the oil.

Efforts to reduce the length of time for changing oil in large vehicles include devices that rapidly remove the oil from the oil pan by use of a suction pump. The pump is connected to the oil pan by either a quick connect coupling attached directly to a quick connect nipple installed in the drain plug opening or to a hose which is mounted directly to the drain plug opening. An operator activates the suction pump, which removes the old oil from the oil pan and sends it to a used oil containment tank. While the oil is being removed, the operator removes the filter(s), drains the oil out, fills up new filter(s) with fresh oil, and replaces the filters on the engine. When the old oil has been removed, the operator then removes the quick connect coupling and replenishes the engine with fresh oil either by manually pouring the oil into the filler opening in the engine or by using a pressurized nozzle and hose that delivers the oil to the opening in the engine valve cover. Clearly, this method still requires an operator to manually fill fresh oil into the opening of the engine.

Other known devices connect to the oil pan and the oil filter manifold. When activated, these devices use blasts of air to purge the old oil out of the filters and oil galley ways in the engine block while the old oil is being removed from the oil pan with a suction pump. The suction pump continues to pull the old oil out and automatically stops when it detects that the process is finished. Upon receiving a prompt from an operator, fresh oil is added through the oil manifold fitting to fill the filters, the now empty oil galley ways, and the engine pan.

Numerous serious problems are associated with air purge type devices. First, unless completely dry air is used in the system, moisture may be introduced into the oil galley ways of the lubrication system when air is introduced to purge the old oil from the engine. However, it is very difficult and costly to insure that the air is moisture-free. When moisture in the system mixes with the oil, an emulsion is formed which has virtually no lubricating properties. This emulsion is very hard to remove from the system, and can cause early failure of bearings and lubricated frictional surfaces.

A second problem occurs when oil changes are performed in cold weather on a cold engine. Under these conditions, the air pressure may not sufficiently push the thick, cold oil out of the smaller galley ways. When the engine is started, air pockets travel to the bearing surfaces and, for a short time, there is insufficient lubrication on these surfaces, causing early failure of the bearings and lubricated frictional surfaces.

A third and critical area of potential damage from air purge methods occurs in higher powered "turbo-charged" internal combustion engines. Since a turbo operates at a very high rpm, even a brief moment without proper lubrication can cause severe damage to the bearing surfaces, resulting in premature or catastrophic failure of the engine turbo-charge unit. If a pocket of air gets trapped in the small oil line which feeds the turbo bearing surfaces, substantial damage can occur when the turbo activates without sufficient lubrication.

Moreover, air purge methods require installation of fittings and associated hardware which are costly and complex to retrofit on the vehicle engine. Fittings must be mounted on the drain plug opening and the oil manifold. In some engine designs, the filters must be mounted remotely so that the air purge and new oil lines can be attached to the filter base. These prior art processes are not fully automated oil changing systems and require operator input throughout the process. Significantly, none of these known processes can supply different grades of oil or different types of fluid through the same system without substantial mixing of the different fluids.

Serious safety issues also are associated with the air purge processes. For example, if an operator removes the oil filters during the process, he/she risks being subjected to a blast of air and hot oil from the filters. This is a significant risk, since it is difficult to tell when the process has been completed, especially in a noisy shop where the audible prompt from the oil change device may not be heard over the din. Further, since fresh oil is added through the filters, if the oil filters are not in place before the oil change process continues, oil will be dumped on the floor of the shop.

Another problem with air purge processes lies in the potential damage to oil seals in the oil galley way system due to overpressurization of the incoming oil. Generally, fresh oil is supplied to an oil change device via pressurized lines in a shop/maintenance bay. These lines can have in excess of 1000 psig of pressure. Regulators are used to bring the pressure down to approximately 45–50 psig, which is the pressure oil seals are designed to withstand. If the regulator fails, oil at a pressure in excess of 1000 psig can enter the engine oil galley ways, causing serious damage and leaking of the oil seals.

For the foregoing reasons, there a need for a rapid, simple, safe, and inexpensive system for automatically evacuating automotive fluids from and dispensing automotive fluids to fluid receptacles.

SUMMARY

The present invention satisfies these needs by providing an automated system which rapidly evacuates used fluid and replenishes fresh fluid to any fluid receptacle having a drain plug opening. The system of the present invention is particularly useful for changing the oil in an internal combustion engine. However, the present system is separable from and may be connected to any fluid receptacle which has a drain plug opening. Thus, in addition to changing the oil in an internal combustion engine, the present system can be used to change transmission fluid, differential fluid, hydraulic fluid, or crankcase fluids, as well as any hazardous or toxic fluid in a receptacle with a drain plug opening. Moreover, the present system can be adapted to dispense several different grades of oil or different types of fluid without any substantial mixing of the different fluids during the dispensing operation.

A fluid changing system having features of the present invention includes a connecting means for releasably connecting the system to the drain plug opening of a fluid receptacle, evacuation means for evacuating used fluid from the receptacle through the drain plug opening, dispenser means for dispensing fresh fluid to the receptacle through the drain plug opening, valve means for controlling the flow of the used fluid and the fresh fluid through the drain plug opening, and electronic control means in communication with the evacuation means, dispenser means, and valve means for automatically directing the evacuation of used fluid from the receptacle and the replenishment of fresh fluid to the fluid receptacle, through the drain plug opening.

The connector means can be any fitting or coupling which is suitable for attaching the fluid changing system to a drain plug opening. In a particularly preferred embodiment, a quick connect type coupler is used. The quick connect coupler includes a quick connect nipple which is preferably permanently mounted in the drain plug opening. The quick connect nipple communicates with a quick connect coupler which is preferably permanently mounted within a connecter port provided in one end of the valve means of the system of the present invention. For example, prior to an initial oil change using the present system, a quick connect nipple is permanently mounted in the drain plug opening in the oil pan within the internal combustion engine of a vehicle. A vehicle fitted in this manner is then permanently configured for subsequent oil changes using the automated fluid changing system of the present invention.

The evacuation means used in the system of the present invention includes a suction hose, pipe, or other suitable conduit for transporting used fluid by suction force from the fluid receptacle to a waste fluid reservoir. One end of the suction hose is connected to an evacuation port in the valve means, the opposite end of the suction hose empties directly into the waste fluid reservoir. The evacuation means further includes a suction pump connected to the suction hose. The suction pump supplies a suction force to the suction hose for withdrawing the used fluid from the fluid receptacle. A regulator valve is provided within the suction hose for controlling the suction force. A vacuum switch is also disposed within the suction hose between the valve means and the suction pump. During the evacuation phase, the vacuum switch evaluates the vacuum within the suction hose. When the vacuum switch indicates that the vacuum within the suction hose has reached near ambient pressure, substantially all of the used fluid has been removed from the fluid receptacle. Optionally, the present system may be provided with a mechanism for automatically removing a sample of the used fluid for analysis as the fluid is transported through the evacuation means.

The dispenser means used in the system of the present invention includes a dispenser hose, pipe, or other suitable conduit for transporting the fresh fluid under pressure from a fluid storage tank to the fluid receptacle. One end of the dispenser hose is connected to a dispenser port in the valve means, the opposite end of the dispenser hose is connected to at least one fresh fluid storage tank. The dispenser means further includes a pump for dispensing the fresh fluid under pressure through the dispenser hose and a regulator valve for controlling the pressure at which the fluid is dispensed. Preferably, a meter is disposed within the dispenser hose between the regulator valve and the valve means for determining the amount of fresh fluid being dispensed into the fluid receptacle. In a particularly preferred embodiment, the suction hose used to evacuate used fluid and the dispenser hose used to dispense fresh fluid are provided as a coaxial hose having the dispenser hose disposed within the suction hose.

The valve means used in the system of the present invention is typically disposed between the connector means and both the suction hose which removes the used fluid and the dispenser hose which dispenses the fresh fluid. The valve means directs and controls the flow of fluid into and out of the drain plug opening of a fluid receptacle. The valve means is provided with a connector port on one end which is adapted to be connected to the drain plug opening of a fluid receptacle. The valve means also is provided with a suction port through which used fluid is evacuated and a dispenser port through which fresh fluid is dispensed. The valve means may be actuated by air pressure, hydraulic fluids, an electric solenoid or any other suitable means.

In a preferred embodiment, the valve means is a shuttle type valve which is actuated by air pressure from an external source. The valve means can include a diaphragm which is connected to a valve seal by a diaphragm shaft. When the valve means is in a closed position, the valve seal is retained against an outlet port by the force of a retaining spring. If the system adapted to dispense more than one type of fluid, the valve means may be provided with a check valve to prevent the fresh fluid from flowing back into the dispenser hose or pipe and mixing with a different type of fluid. When withdrawing fluid from the fluid receptacle, air pressure is applied to the diaphragm disposed within a diaphragm cavity in the valve means to force the diaphragm outward against the resistance of the retaining spring. As the diaphragm is displaced, the valve seal is released to open the outlet port so that the suction force will draw the used fluid from the fluid receptacle through the connector port of the valve. The used fluid then flows through a cavity within the valve and out the suction port, through the suction hose, and into a waste fluid reservoir. When the vacuum switch indicates that pressure within the suction hose has reached ambient pressure, the regulator valve closes and the air in the diaphragm cavity reverses direction. The diaphragm is then released to close the outlet port to prevent the suction force from entering the valve cavity. The dispenser means then begins pumping fresh fluid through the dispenser hose, through the dispenser port of the valve means, through the connector port of the valve means, through the drain plug opening, and into the fluid receptacle. In a preferred embodiment, the valve means is provided with a check valve to prevent fresh fluid from flowing back into the dispenser hose.

In a particularly preferred embodiment, the fluid changing system of the present invention is also provided with means for applying air pressure to the dispenser hose to force any remaining fluid out of the dispenser hose and into the fluid receptacle. The check valve prevents any fresh fluid from flowing back into the dispenser hose so that different grades of oil, or different types of fluid, may be dispensed into fluid receptacles through the same dispenser hose without any substantial mixing of the different grades or types of fluid.

The evacuation means, dispenser means and valve means used in the system of the present invention function automatically through communication with the electronic control means. The electronic control means may be a relay configuration, computer controller or any other suitable means for automatically directing the functions of the system of the present invention. In a preferred embodiment, the electronic control means is a computer controller which automatically initiates the operation of the valve means, the evacuation phase, and the dispensing phase of the fluid changing process. The electronic control means directs these functions through a user interface panel that prompts the user at key intervals during the fluid changing process. The user interface for the fluid changing system of the present invention is, preferably, a display panel having user interface selection switches which provide visual communication with the user and audio annunciators for audio communication with the user. The display panel or screen may be an LCD, LED, Vacuum, Fluorescent or any equivalent technological means for displaying menus to be read by an operator. The computer controller used in the system of the present invention can store data which pertains to the fluid change. The computer controller may, optionally, communicate with a printer which provides a written record of the data associated with the fluid change.

By evacuating used fluid and dispensing fresh fluid through the same drain plug opening, the system of the present invention overcomes many of the hazards of current methods of changing fluid. The present invention is a closed system which carries the used fluid directly from the fluid receptacle to the waste fluid reservoir to eliminate any risk that the used fluid will be spilled and to ensure that all of the used fluid will be removed from the fluid receptacle. Since the present system does not utilize air to purge old oil from an automotive system, many of the dangers to both the operator and the automotive system are completely eliminated. Moreover, the present system provides a means for accurately measuring the amount of used fluid evacuated from the fluid receptacle and accurately measuring the amount of fresh fluid dispensed into the fluid receptacle.

BRIEF DESCRIPTION OF THE DRAWINGS

These and other features, aspects, and advantages of the present invention will become better understood with regard to the following description, appended claims, and accompanying drawings where:

DESCRIPTION

While the following description illustrates a configuration of the system of the present invention which is particularly suitable for removing used oil from and dispensing the fresh oil to the internal combustion engine of a vehicle, it is to be understood that the present system is suitable for changing any type of fluid in a fluid receptacle having a drain plug opening. Further, although the present system is described as having the capacity to dispense several different grades of oil, the system may be configured to dispense either one type of fluid or more than one type of fluid. The present system also may be used to remove and dispense any type of fluid. In a preferred embodiment, substantially all of the principal components of the automated fluid changing system are enclosed in a cabinet formed from sheet metal or other suitable material.

Figure 1:
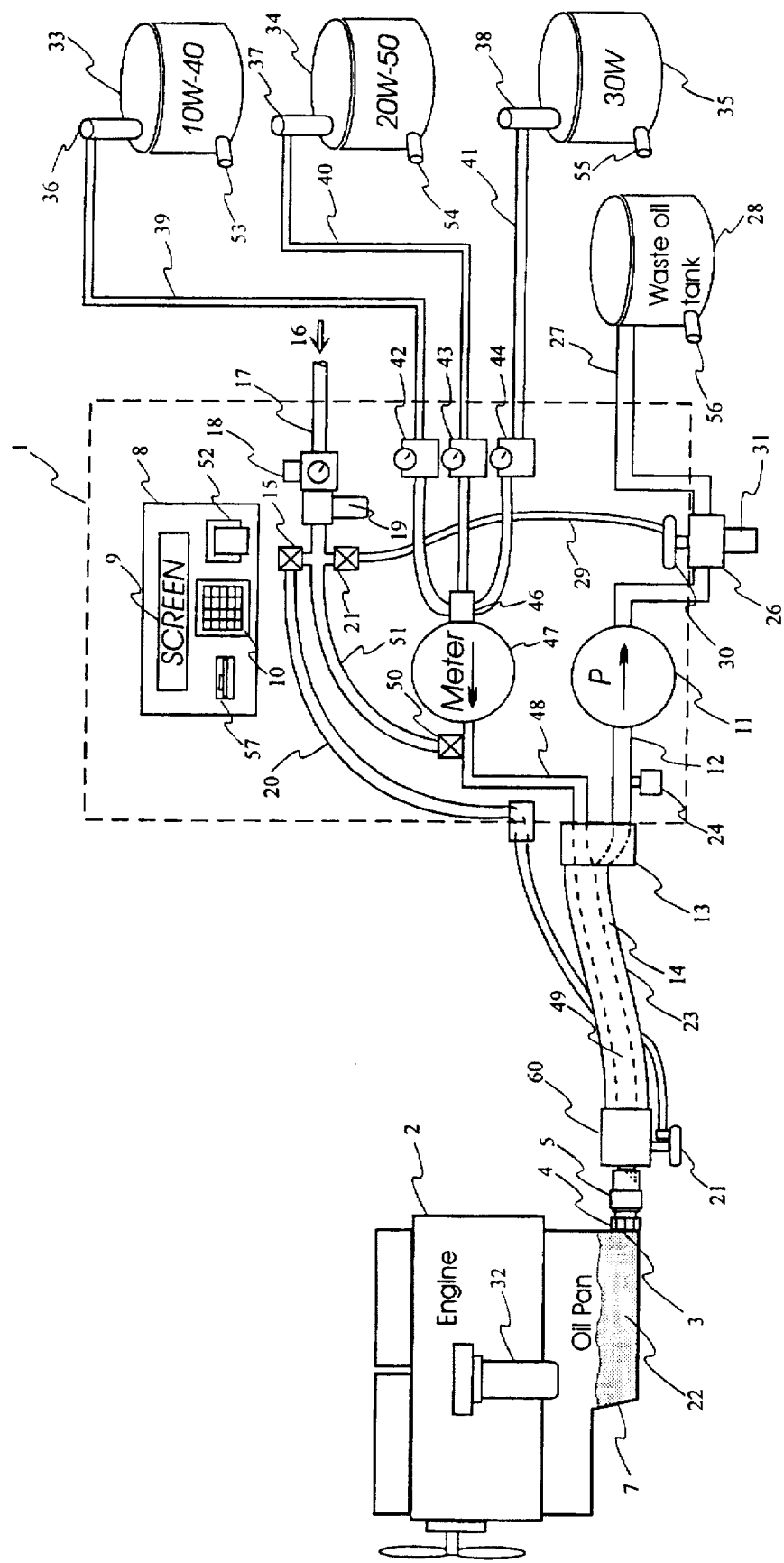
FIG. 1 is a schematic drawing of a system configuration embodying features of the automated fluid changing system of the present invention.
Figure 2:
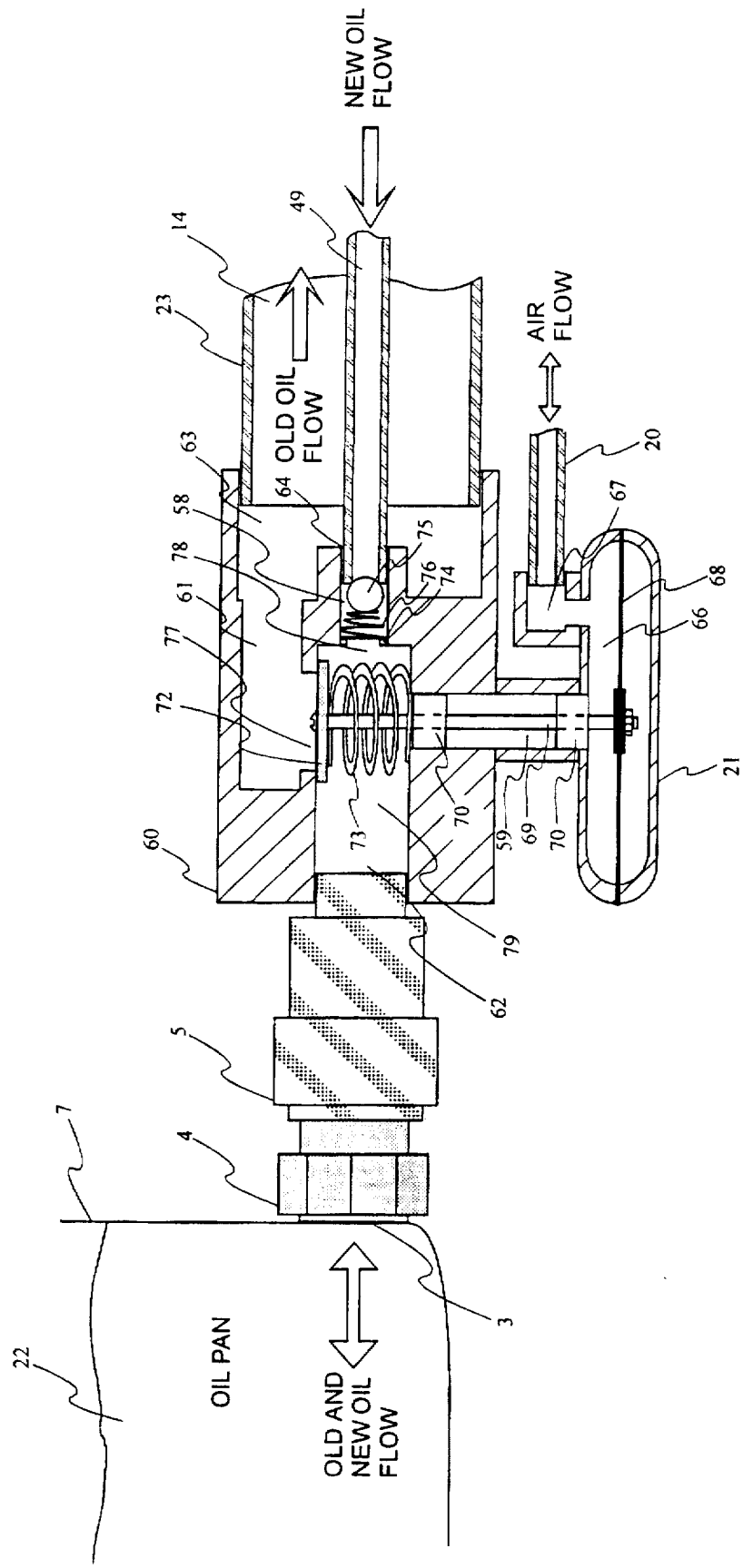
FIG. 2 is a detailed cut away drawing embodying features of a valve used in the automated fluid changing system of the present invention.

Referring now to the drawings, there is shown in FIG. 1, the automated fluid changing system of the present invention, generally designated as 1. The system 1 is removably connected to oil pan 7 in engine 2 by a quick connect nipple 4, which is mounted in the drain plug opening 3 of oil pan 7, and a quick connect coupling 5 which is affixed to a valve 60. The valve 60 directs the flow of fluids to and from the oil pan 7. As shown in FIG. 2, valve 60 includes a valve housing 6 which may be formed from any material which is suitable to withstand the temperatures, fluids, and pressures required for changing a particular fluid. In a preferred embodiment, valve housing 6 is made from aluminum. Valve 60 is provided at one end with a connector port 62. Quick connect coupling 5 is disposed within connector port 62 and attaches to nipple 4 to connect system 1 to the drain plug opening 3. Preferably, quick connect nipple 4 is permanently mounted within drain plug opening 3 and quick connect coupling 5 is permanently mounted within connector port 62. While the use of quick connect couplers 4 and 5 provides the most convenient and efficient means to connect the system 1 to the drain plug opening 3, any suitable connecting means may be employed for attaching system 1 to a fluid receptacle.

The connector port 62 serves as a passageway for fluids to enter and exit a valve chamber 79 disposed within the housing 6 of valve 60. Valve chamber 79 is provided with an outlet port 77 through which the used oil 22 flows, and an inlet port 78 through which the fresh oil flows. Outlet port 77 opens into one end of a suction cavity 61 which is also disposed within the body 6 of valve 60. The opposite end of suction cavity 61 is provided with a suction port 63 for receiving a suction conduit 14. Inlet port 78 opens into one end of a check valve chamber 58 within valve 60. The opposite end of check valve chamber 58 is provided with a dispenser port 64. The fresh fluid flows through dispenser port 64, through check valve chamber 79, through inlet port 78, and into valve chamber 79.

In a preferred embodiment, the valve 60 is actuated by air pressure which flows through air line 20, through air flow port 67 into a diaphragm cavity 66. The air pressure displaces a diaphragm 68, which is horizontally disposed within cavity 66 of valve 60. The diaphragm 68 is connected to one end of a valve shaft 69. Valve shaft 69 is positioned perpendicular to diaphragm 68 and is maintained in a vertical alignment within a valve shaft channel 59 by seals 70 and 71. Valve shaft channel 59 is disposed between diaphragm cavity 66 and valve chamber 79. The seals 70 and 71 also prevent used and fresh fluid from flowing through the valve shaft channel 59 into the diaphragm cavity 66. The end of shaft 69 opposite diaphragm 68 is provided with valve seal 72. A retaining spring 73 is disposed between valve seal 72 and shaft seal 70. When valve 60 is in a closed position, the force of retaining spring 73 retains valve seal 72 against outlet port 77 to prevent the suction force from being exerted on valve cavity 79.

A ball check valve 75 is seated against the orifice of dispenser conduit 49 which is connected to dispenser port 64. Ball check valve 75 is retained against the open end of dispensing conduit 49 by ball check valve spring 76. Ball check valve spring 76 rests against stop pins 74, which protrude into check valve chamber 58 at inlet port 78.

In a particularly preferred embodiment, valve 60 is connected to a coaxial hose 23, which includes an outer suction conduit 14 and an inner dispenser conduit 49. One end of the outer suction conduit 14 is connected to suction port 63 of valve 60. The suction conduit 14 may be sealed and joined to suction port 63 by threads (not shown) or any other suitable sealing or connecting means. One end of the inner dispenser conduit 49 is connected to dispenser port 64 of valve 60 and may be sealed to dispenser port 64 by O-rings (not shown) or any other suitable sealing or connecting means. The ends of both suction conduit 14 and dispenser conduit 49 which are opposite valve 60 are connected to a splitter 13. Splitter 13 directs dispenser conduit 49 to communicate with dispenser pipe 48 and directs suction conduit 14 to communicate with suction hose 12.

Suction hose 12 is provided with a suction pump 11. Suction pump 11 applies a suction force to suction hose 12 and suction conduit 14 for withdrawing used oil 22 from oil pan 7. A vacuum switch 24 is disposed within suction hose 12 between splitter 13 and suction pump 11. Vacuum switch 24 evaluates the pressure within suction hose 12 to determine when all of the used oil 22 has been evacuated from oil pan 7. Optionally, a sampler 26 may be provided in waste oil hose 27 for removing a sample of the used oil to submit for evaluation. In one embodiment, sampler 26 may be air actuated by means of a control operator 30. Control operator 30 is actuated by air flowing through air line 29 from an external air source 16. Bottle 31, which receives the sample of used oil, is removably connected to sampler 26.

Air pressure is supplied to system 1 from the external source 16 through air line 17. Air line 17 is connected to a regulator 18. Regulator 18 controls the pressure of the air which flows through air lines 20, 29 and 51. Air line 20 is connected on one end to air flow port 67 in the diaphragm cavity 66 of valve 60. The opposite end of air line 20 is connected to regulator 18. Air valve 15 is disposed within air line 20 for controlling the air flow to the valve operator 21 on valve 60. Air valve 15 may be a 3-way valve or any suitable means for controlling the air flow. Air line 51 is connected on one end to dispenser pipe 48. The opposite end of air line 51 is connected to regulator 18. Air valve 50 is disposed within air line 51 to control the flow of air into dispenser pipe 48. Air pressure from external source 16 is used to actuate valve 50, allowing the air to pass through to flush any remaining fresh fluid out of dispenser pipe 48. Air line 29 is connected on one end to sampler 26 and on the other end to regulator 18. Air valve 21 is disposed within air line 29 to control the flow of air to sampler 26. Optionally, the regulator 18 may be provided with an air filter 19.

Dispenser pipe 48 is connected to a meter 47 which is provided with a meter inlet 46. The meter inlet 46 receives the fresh fluid lines 39, 40, and 41 for transporting fresh fluids from fluid storage tanks 33, 34, and 35. The fresh fluid storage tanks 33, 34 and 35 are provided with pumps 36, 37 and 38 which withdraw the fresh fluid and dispense the fluid through lines 39, 40 and 41 under pressure. Fresh fluid lines 39, 40, and 41 may be provided with regulator valves 42, 43, and 44, respectively, for controlling the flow rate and pressure of the fresh fluid. Fluid level indicators 53, 54 and 55 may be provided on fresh fluid tanks 33, 34, and 35 for monitoring the amount of fresh fluid stored in the tanks.

A computer controller 8 communicates with system 1 of the present invention to automatically initiate the evacuation phase and the dispensing phase of the fluid changing process of the present invention. Computer controller 8 may include a screen 9 for displaying menus to prompt an operator of the system 1. Numeric keypad 10 may be used by an operator to enter the commands required to activate the system 1. Computer controller 8 may be provided with a printer 52 for recording data pertaining to the fluid change. Computer controller 8 also may be provided with a magnetic strip card reader 57 or any other suitable means for receiving information pertaining to the fluid change, such as the vehicle identification number or the number of quarts of fluid required.

Figure 3:
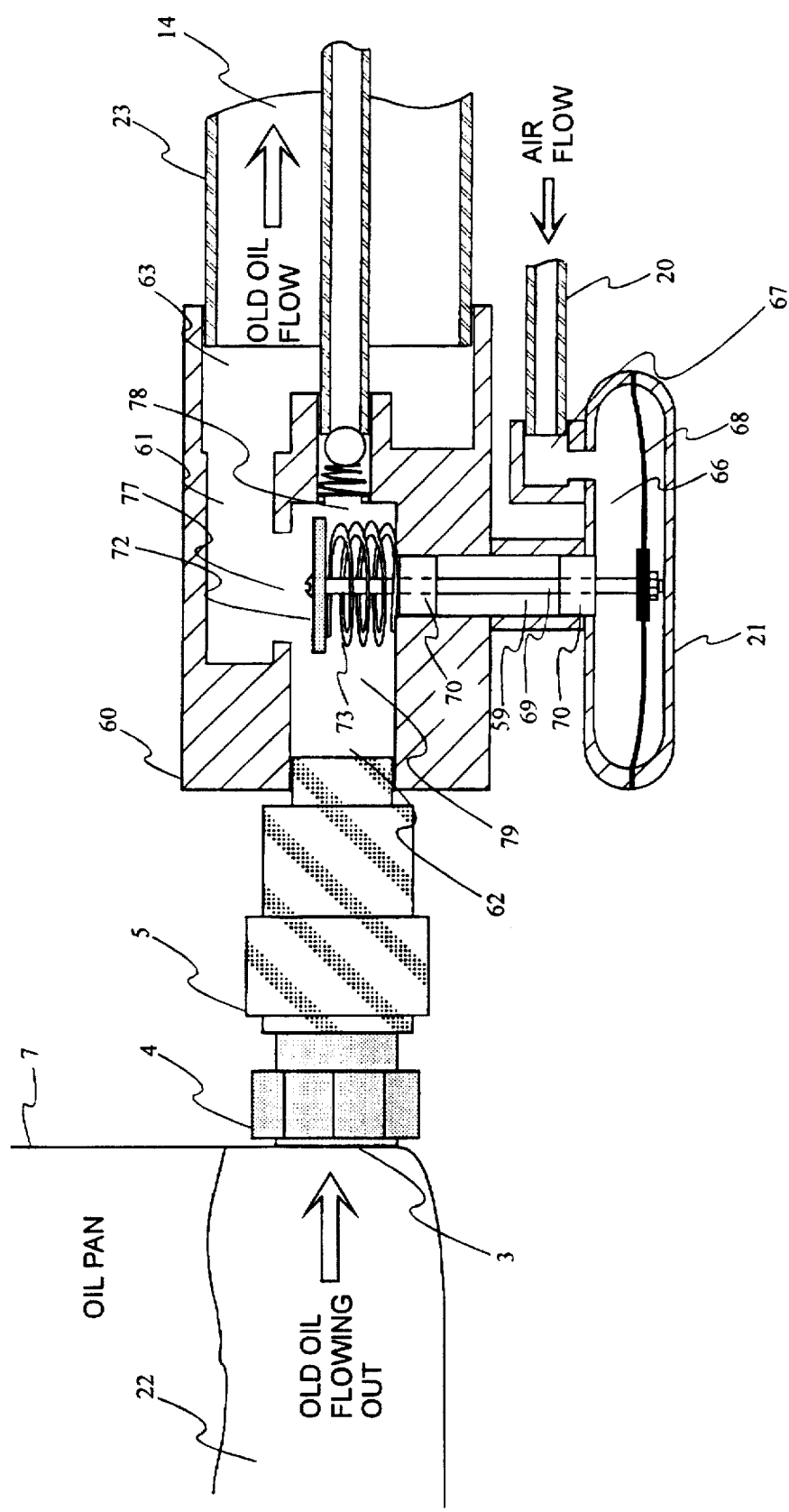
FIG. 3 is a detailed drawing showing the valve of FIG. 2 in the used fluid evacuation position.

To change the oil 22 in the oil pan 7 of an internal combustion engine 2 using the fluid changing system 1 of the present invention, a quick connect nipple 4 is mounted in the drain plug opening 3 of oil pan 7. Typically, quick connect nipple 4 remains permanently in drain plug opening 3 so that the vehicle is permanently configured for the automated oil change process of the present invention. The system 1 is then connected to the quick connect nipple 4 by the quick connect coupling 5 which is affixed to the connector port 62 in valve 60. The fluid change system 1 is activated by operator interface with the computer controller 8. The LCD screen 9 prompts the operator to use numeric keypad 10 to enter the commands required to activate system 1. When the oil change process has been initiated by an operator, the suction pump 11 is energized to begin the evacuation of used oil 22. As the suction pump 11 operates, a suction force is applied to suction hose 12. The splitter 13 directs the flow of the suction force to the suction conduit 14 within coaxial hose 23. As suction pump 11 is activated, air valve 15 opens to allow air to flow from the external source 16 through air line 17. The air travels through regulator 18 and filter 19, through the now open air valve 15, and into air line 20. As shown in FIG. 3, air from air line 20 enters diaphragm cavity 66 through air flow port 67 to force diaphragm 68 in a downward direction. As diaphragm 68 moves downward, the diaphragm shaft 69 pulls valve seal 72 away from outlet port 77, allowing the suction force to flow from suction cavity 61 through outlet port 77 and into valve chamber 79. The suction force draws the used oil 22 through the quick connect nipple 4 in drain plug opening 3, through the quick connect coupling 5, and into valve cavity 79 within valve 60. The used oil 22 exits valve cavity 79 through outlet port 77. The used oil 22 flows through suction cavity 61 and exits valve 60 through suction port 63. The used oil 22 is then drawn through suction conduit 14 in coaxial hose 23, through the splitter 13 and to the suction hose 12. The used oil 22 is transported through suction hose 12, past vacuum switch 24, through the suction pump 11 and into waste oil hose 27. Waste oil hose 27 directs the used oil 22 through sampler 26. Used oil 22 exits sampler 26 through the opposite end of waste oil hose 27 and is deposited in waste oil reservoir 28. If the operator elected to remove a sample of the used oil for evaluation, air valve 21 will open as used oil 22 passes through sampler 26 to allow air to flow through air line 29 to activate operator 30 on sampler 26. The air pressure flowing through air line 29 opens a valve (not shown) in sampler 26 to deposit a sample of the used oil 22 into bottle 31. When the oil change process is complete, bottle 31 can be removed and sent to an oil analysis lab for evaluation.

As the used oil 22 is evacuated from oil pan 7, the vacuum switch 24 evaluates the vacuum within suction hose 12. When the vacuum within suction hose 12 has shifted to near ambient pressure, a signal is sent to the computer controller 8 to disengage the suction pump 11. Simultaneously, the computer controller 8 signals air valve 15 to close, allowing the air in diaphragm cavity 66 to reverse the direction of flow and exit cavity 66 through air flow port 67. As the pressure in diaphragm cavity 66 is returned to ambient, retaining spring 73 forces valve seal 72 against outlet port 77 to close valve chamber 79.

Figure 4:
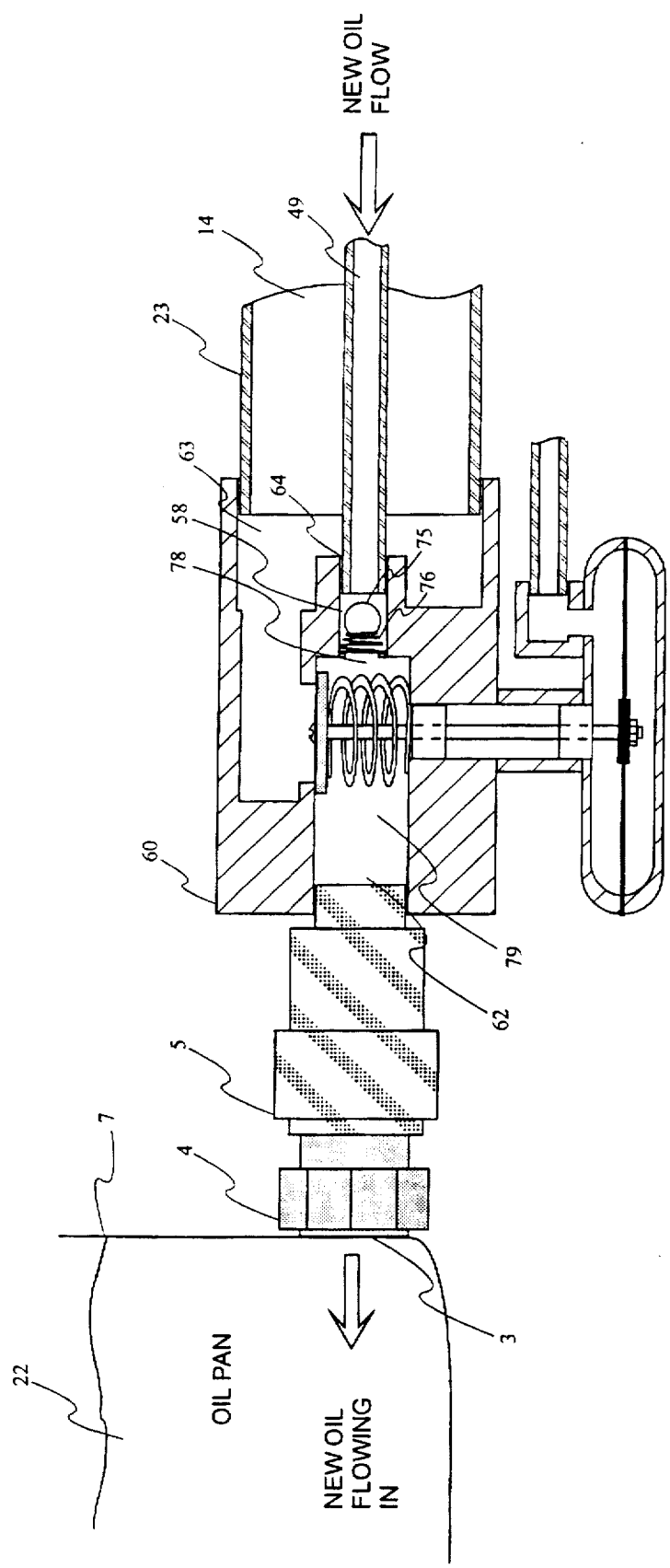
FIG. 4 is a detailed drawing showing the valve of FIG. 2 in the fresh fluid dispensing position.

As the suction pump 11 is disengaged and valve 60 returns to a closed position, the computer controller 8 opens one of the valves 42, 43, or 44 corresponding to the selected grade of oil to be dispensed into the oil pan 7. Referring to FIG. 1, for example, if 20W/50 weight oil is selected initially, valve 43 opens to allow fresh 20W/50 weight oil to flow from tank 34 through pump 37. Pump 37 forces the fresh 20W/50 oil under pressure through pipe 40, through open valve 43, into meter inlet 46 and through meter 47, which measures the volume of oil being dispensed. The fresh oil then continues through dispenser pipe 48 to splitter 13, which directs the fresh oil to flow into dispenser conduit 49 within coaxial hose 23. The fresh oil passes from dispenser conduit 49 through dispenser port 64 in valve 60. As shown in FIG. 4, pressure from the fresh oil forces ball check valve 75 against the opposing ball check valve spring 76. This allows the fresh oil to pass through check valve chamber 58 via inlet port 78 into valve chamber 79. The fresh oil exits valve chamber 79 through connector port 62 via quick connect couplers 4 and 5 to enter the oil pan 7 through the drain plug opening 3. Valve 60 controls the flow direction of both the used and the fresh oil to prevent the fresh oil from entering suction conduit 14 or returning to dispenser conduit 49 in coaxial hose 23.

As the fresh fluid dispensing phase is completed, air valve 50 opens to allow air to flow from air line 51, through open air valve 50, and into dispenser pipe 48. The air flows from dispenser pipe 48 into dispenser conduit 49 to force any remaining fresh oil out of pipe 48, conduit 49, and valve 60, and into oil pan 7. Ball check valve 75 prevents any fresh oil from traveling back into dispenser conduit 49 so that there is no substantial mixing of the fresh oil with a different grade of oil which may be subsequently dispensed through system 1 of the present invention.

At any time during the process of changing the oil using the system 1, an operator may remove oil filter 32 and replace it with a new filter. When the oil change process has been completed, data pertaining to the oil change may be stored into the computer controller 8. Optionally, data may be printed on printer 52.

Figure 5:
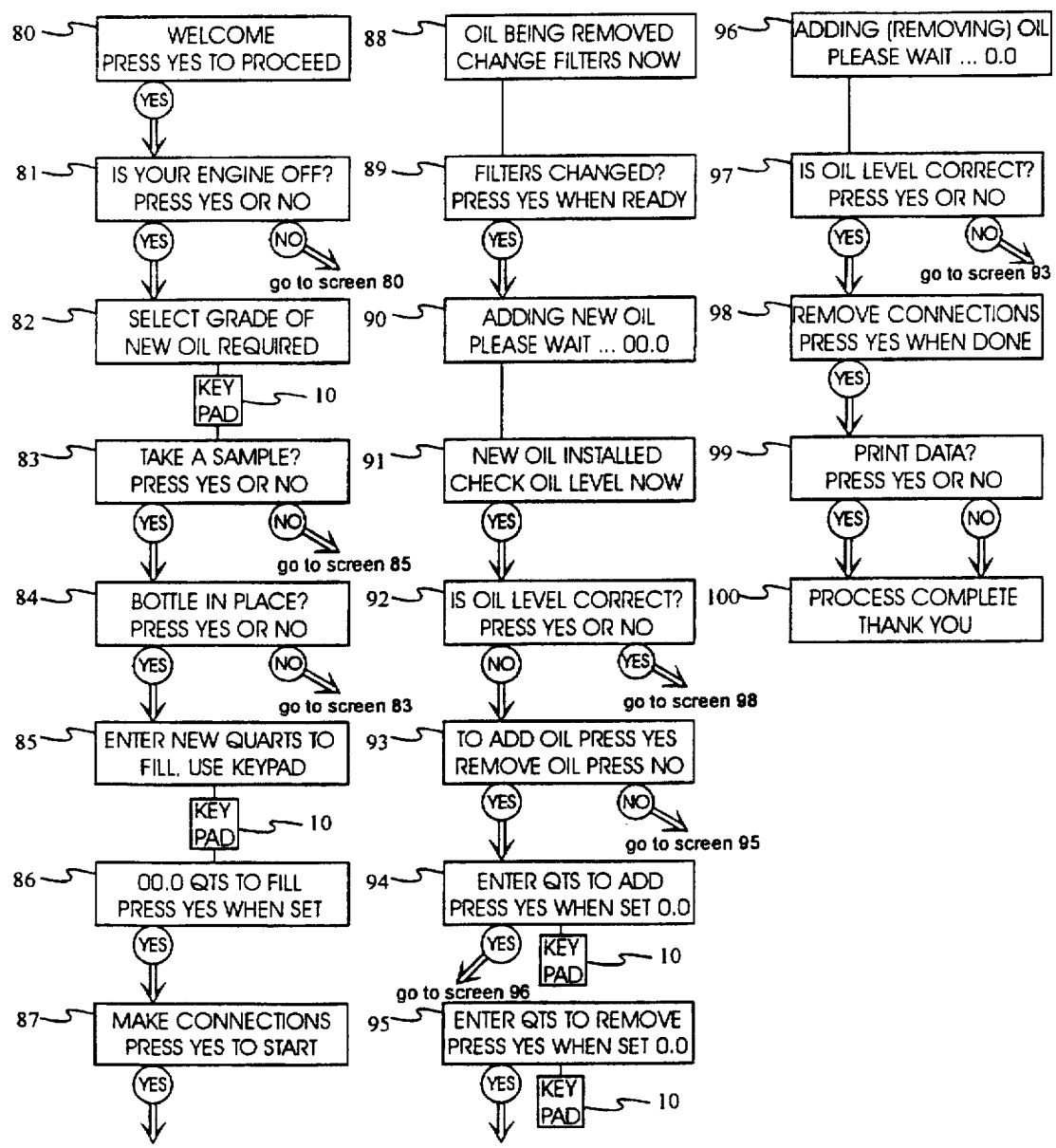
FIG. 5 is a flow diagram embodying features of a software menu for communication between an operator and the automated fluid changing system of the present invention.

An interface menu suitable for use with the software in computer controller 8 is illustrated in FIG. 5. The software is written and programmed into the computer controller 8 and is specific in nature to the operation of the automated fluid changing system 1. As the operator initiates an oil change process, the computer interface screen 9 displays menus which drive the controller 8 to automatically activate the appropriate components in the fluid changing system 1 of the present invention. A typical interface menu is described with reference to FIG. 5.

The computer interface screen 9 begins with the statement "Welcome. Press YES to Proceed" displayed in screen 80.

If Yes is entered, the computer controller screen 81 displays the statement "Is Your Engine Off? Press Yes or No."

If No is entered, then the computer controller screen 81 returns to the statement displayed on screen 80.

If Yes is entered, the computer controller screen 82 displays the statement "Select Grade of New Oil Required."

After a specific grade of fresh oil is selected, the computer controller screen 83 displays the statement "Take a Sample? Press YES or NO."

If NO is entered, the computer controller screen 85 is displayed.

If YES in entered, the computer controller screen 84 displays the statement "Bottle in Place? Press YES or NO."

If NO is entered, the computer controller 8 will not allow the operator to continue and screen 83 will be displayed again.

If YES is entered, the computer controller screen 85 displays the statement "Enter New Oil Quarts To Fill. Use Keypad." At this time, the operator enters the desired number of quarts of fresh oil using the keypad 10. The computer controller screen 86 displays the statement "00.0 QTS To Fill. Press YES When Set." The "00.0" numbers will change as the operator enters the desired number of quarts. For example, if the operator enters the number 44.0 indicating that 44 quarts are needed, then the "00.0" numbers on the screen will read "44.0." After the quantity is entered and YES is entered, the computer controller screen 87 displays the statement "Make Connections. Press YES to Start."

If NO is entered, then the computer controller screen 87 continues to display the same statement.

If YES is entered, then the computer controller screen 88 displays the statement "Oil Being Removed, Change Filters Now." The computer controller screen 88 continues to display this statement for a predetermined period of time. Then, computer controller screen 89 may optionally display the statement "Filters Changed? Press YES When Ready." If the optional statement is not included in the system's program, then computer controller 8 will automatically begin refilling oil pan 7 and screen 90 will be displayed.

If NO is entered, the computer controller screen 89 continues to display the same statement.

If YES is entered, the computer controller screen 90 displays the statement "Adding New Oil, Please Wait . . . 00.0." The numeric display "00.0" indicates the number of quarts being dispensed to oil pan 7 and counts down or up (optional) until the total number of quarts desired have been dispensed to oil pan 7.

Upon completion of the dispensing phase, the computer controller screen 91 displays the statement "New Oil Installed, Check Oil Level Now." At this time, the operator should check the oil level in the engine of the vehicle being serviced. After a predetermined period of time, the computer controller screen 92 displays the statement "Is Oil Level Correct?, Press Yes or No."

If YES is entered, the computer controller screen 98 will be displayed.

If NO is pressed, the computer controller screen 93 displays the statement "To Add Oil Press YES, Remove Oil Press NO."

If YES is entered, the computer controller screen 94 displays the statement "Enter QTS To ADD, Press YES when set 0.0." As the operator uses the numeric keypad 10 to enter the number of quarts to be added, the numeric display on screen 94 changes from "0.0" to the number of quarts entered. For example, if the operator desires to add 2 and ½ quarts of oil, the numeric value of 2.5 should be entered. This value will be displayed on the computer controller screen 94 in place of the numeric value 0.0.

If NO is entered, the computer controller screen 95 displays the statement "Enter QTS To Remove, Press YES When set 0.0." As the operator uses the numeric keypad 10 to enter the number of quarts to be removed, the numeric display on screen 95 changes from "0.0" to the number of quarts entered. For example, if the operator desires to remove 1 and ½ quarts of oil, the numeric value of 1.5 is entered. This value is displayed on the computer controller screen 95 in place of the numeric value of 0.0.

After the desired amount of oil has been added or removed, and YES is entered to indicate that the amount to be added or removed has been set, the computer controller screen 96 displays either the statement "Adding Oil, Please Wait . . . 0.0" for the adding oil procedure or the statement "Removing Oil, Please Wait . . . 0.0" for the removal of oil procedure. In either case, the numeric value on the computer controller screen 96 will scroll to zero value as the procedure is being executed. Upon completion of the procedure, the computer controller screen 97 displays the statement "Is Oil Level Correct, Press YES or NO."

If NO is entered, the computer controller screen 93 will be displayed and the sequence of steps for adding or removing oil will be repeated.

If YES is entered, the computer controller screen 98 displays the statement "Remove Connections, Press YES When Done." When YES is entered, the computer controller screen 99 displays the statement "Print Data? Press YES or NO."

If NO is entered, the computer controller screen 100 displays the final statement "Process Complete, Thank you."

If YES is entered, the computer controller 8 will print the designated data on either an internal printer 52 or on a remote printer connected to the computer controller 8. The computer controller screen 100 then displays the final statement "Process Complete, Thank you."

After a predetermined period of time, the computer controller screen automatically resets to display the statement in screen 80.

Although the invention is described with respect to a preferred embodiment, modifications thereto will be apparent to those skilled in the art. Therefore, the scope of the invention is to be determined by reference to the claims which follow.

What is claimed is:

1. An automated system for changing the fluid in a fluid receptacle having a drain plug opening which comprises:

an evacuation means in selective fluid communication with the drain plug opening for evacuating used fluid from said fluid receptacle through the drain plug opening;

a dispenser means in selective fluid communication with the drain plug opening for dispensing fresh fluid into said fluid receptacle through the drain plug opening;

a connector means in fluid communication with the drain plug opening for releasably connecting said system to the drain plug opening;

a valve means for directing the flow of said used fluid from the fluid receptacle through the drain plug opening and for directing the flow of said fresh fluid into the fluid receptacle through said drain plug opening, said valve means having a first chamber through which the used fluid flows and a second chamber through which the fresh fluid flows, said valve means being adapted to allow the used fluid to flow through said first chamber and said fresh fluid to flow through said second chamber without substantially commingling the used fluid with the fresh fluid during the fluid changing operation, and said valve means being in continuous fluid communication with the connector means, the evacuation means, and the dispenser means until the fluid changing system has automatically replaced the used fluid in the fluid receptacle with the fresh fluid; and an electronic control means in electronic communication with each of said evacuation means, said dispenser means, and said valve means for automatically directing the evacuation means to remove the used fluid from the fluid receptacle through the drain plug opening and for automatically directing the dispenser means to dispense fresh fluid into the fluid receptacle through the drain plug opening prior to disconnecting the system from the drain plug opening.

2. A system according to claim 1 wherein said connector means comprises a quick connect coupler mounted in the drain plug opening which connects with and is in fluid communication with a quick connect coupler mounted in the valve means.

3. A system according to claim 1 wherein said evacuation means comprises:

a suction conduit through which a suction force is applied to withdraw the used fluid from the fluid receptacle, said suction conduit having a first end which is in fluid communication with the first chamber of said valve means and a second end which is in fluid communication with a used fluid reservoir; and a suction pump in communication with said electronic control means and said suction conduit for automatically applying a suction force to the suction conduit to draw the used fluid from the fluid receptacle through the connector means in the drain plug opening and through the first chamber of said valve means and into said used fluid reservoir.

4. A system according to claim 3 wherein said evacuation means further comprises a sampling means disposed within said suction conduit for removing a sample of the used oil as the oil is removed from the fluid receptacle.

5. A system according to claim 1 wherein said dispenser means comprises:

a dispenser conduit through which fresh fluid is dispensed from a fresh fluid storage tank into said fluid receptacle, said dispenser conduit having a first end which is in fluid communication with the second chamber of said valve means and a second end which is in fluid communication with a fresh fluid supply; and a pump means in communication with the electronic control means and the dispenser conduit for automatically providing pressure within the dispenser conduit to direct the fresh fluid from the fresh fluid supply through the second chamber of the valves means, the connector means, and into the fluid receptacle through the drain plug opening.

6. A system according to claim 5 wherein said dispenser means further comprises a meter means in communication with said electronic control means and said dispenser conduit for automatically measuring the amount of fresh fluid being dispensed into said fluid receptacle.

7. A system according to claim 1 wherein said valve means comprises:

a valve housing having first and second ends, said first end having a connection port for receiving said connector means and said second end having a suction port for receiving a suction conduit and a dispenser port for receiving a dispenser conduit;

a valve cavity defined by said housing, said cavity having a first chamber in fluid communication with the connection port and the suction port and a second chamber in fluid communication with the connection port and the dispenser port; and a valve assembly movable between an open position and a closed position which is in communication with said electronic control means to automatically seal the first chamber of said valve cavity and prevent fresh fluid from entering the first chamber when fresh fluid is dispensed through the second chamber of the valve cavity.

8. A system according to claim 7 wherein said valve assembly is actuated by air pressure from an external source to open the seal on said first chamber of said valve cavity when used fluid is withdrawn from the fluid receptacle through said valve means.

9. A system according to claim 5 wherein said dispenser conduit and said suction conduit are provided as a coaxial hose having the dispenser conduit disposed within the suction conduit.

10. A system according to claim 1 wherein said electronic control means comprises a computer controller in electronic communication with a display and control panel for user interface and control of the valve means, the evacuation means and the dispensing means so that said system automatically withdraws used fluid from said fluid receptacle through the drain plug opening and automatically dispenses fresh fluid into the fluid receptacle through the drain plug opening without disconnecting the system from the drain plug opening.

11. A system according to claim 6 which further comprises a plurality of dispenser conduits and a plurality of fresh fluid storage tanks, said dispenser conduits in fluid communication with said meter means and said storage tanks.

12. A system according to claim 1 which further comprises an air conduit disposed between said dispenser conduit and an external air source for transporting air under pressure through the dispenser conduit to force any residual fresh fluid out of said dispenser conduit and into said fluid receptacle so that there is no substantial mixing of the fresh fluid with a different type of fresh fluid subsequently dispensed by the fluid changing system.

13. A valve for use in an automated system for changing fluids in a fluid receptacle having a drain plug opening, said valve comprising:

a valve housing having first and second ends, said first end having a connection port for receiving a connector means and said second end having a suction port for receiving a suction conduit and a dispenser port for receiving a dispenser conduit;

a valve cavity defined by said housing, said cavity having a first chamber in fluid communication with the connection port and the suction port and a second chamber in fluid communication with the connection port and the dispenser port, said first and second chambers being separated by opposing shoulders which define an opening between the first and second chambers; and a valve assembly mounted within said housing which is movable between an open position and a closed position, said valve assembly comprising a valve shaft having a diaphragm connected to a first end of said shaft and a valve seal connected to a second end of said shaft, said valve seal being retained against the opening between the first and second chambers by a compression spring biased against the valve seal when said valve assembly is in a closed position, and said valve assembly being disposed within a valve shaft channel which forms a passageway between the valve cavity and a diaphragm cavity, said diaphragm cavity being provided with an aperture for receiving a means to apply pressure to said diaphragm to force said valve assembly into an open position.

14. A valve according to claim 13 which further comprises a check valve which is movable between an open position and a closed position, said check valve resting against the dispenser port within the second chamber of said housing when the check valve is in the closed position to prevent fresh fluid from exiting the second chamber through the dispenser port.

15. A system according to claim 3 which further comprises:

a vacuum indicating means disposed within said suction conduit between the first end of the suction conduit and said suction pump for indicating when substantially all of the used fluid has been evacuated from the fluid receptacle.

16. A system according to claim 5 which further comprises:

a regulator means in communication with the electronic control means and the dispenser conduit for automatically regulating the pressure of the fresh fluid through the dispenser conduit.

17. A valve for use in a system for changing fluid at a single point on a fluid reservoir, said valve comprising:

a valve housing having a connector port for connecting said valve to the single point on the fluid reservoir, said valve housing further having at least one suction port and at least one dispenser port, said suction and dispenser ports in selective fluid communication with the connector port;

a plurality of internal cavities disposed within said valve housing to define a plurality of fluid passageways between the connector port and the suction and dispenser ports;

at least one valve seal disposed within said valve housing, said valve seal being moveable between an open and a closed position to prevent fluid flow in one or more of said cavities whereby fluid communication is selectively established through one of said passageways between said connector port and one of said discharge and suction ports.

18. A valve according to claim 17 wherein said valve seal is maintained in said closed position by a compression spring biased against the valve seal, said valve further comprising a shaft having a first end and a second end, said first end of the shaft connected to the valve seal, said second end of the shaft connected to an actuator means for actuating the valve seal between said open and said closed position.

19. An automated system for changing the fluid in a fluid receptacle having a drain plug opening which comprises:

an evacuation means selectively in fluid communication with the drain plug opening for evacuating used fluid from said fluid receptacle through the drain plug opening;

a dispenser means selectively in fluid communication with the drain plug opening for dispensing fresh fluid into said fluid receptacle through the drain plug opening;

a connector means in fluid communication with the drain plug opening for releasably connecting said system to the drain plug opening of said fluid receptacle;

a valve for directing the flow of said used fluid from the fluid receptacle through the drain plug opening and for directing the flow of said fresh fluid into the fluid receptacle through the drain plug opening, said valve comprising a valve housing having first and second ends, said first end having a connection port for receiving said connector means and said second end having a suction port for receiving a suction conduit and a dispenser port for receiving a dispenser conduit, said valve being in continuous fluid communication with the connector means, the evacuation means, and the dispenser means until the fluid changing system has automatically replaced the used fluid in the fluid receptacle with the fresh fluid;

a valve cavity defined by said valve housing, said cavity having a first chamber in fluid communication with the connection port and the suction port and a second chamber in fluid communication with the connection port and the dispenser port;

a valve assembly movable between an open position and a closed position to automatically seal the first chamber of said valve cavity and prevent fresh fluid from entering the first chamber when fresh fluid is dispensed through the second chamber of the valve cavity; and a computer controller in electronic communication with a display and control panel for user interface and control of the valve, the evacuation means, and the dispenser means so that said system automatically withdraws used fluid from the fluid receptacle through the drain plug opening and automatically directs the dispenser means to dispense fresh fluid into the fluid receptacle through the drain plug opening prior to disconnecting the system from the drain plug opening.

20. A system according to claim 19 wherein said first and second chambers of said valve cavity are separated by opposing shoulders which define an opening between said first and second chambers.

21. A system according to claim 20 wherein said valve assembly comprises a shaft having an actuator connected to a first end of said shaft and a valve seal connected to a second end of said shaft, said valve seal being retained against the opening between the first and second chambers by a compression spring biased against the valve seal when said valve assembly is in a closed position, said valve seal being movable to an open position by a force applied by said actuator.

* * * * *